United States Patent

Haug et al.

Patent Number: 5,948,190
Date of Patent: Sep. 7, 1999

[54] METHOD OF MONITORING THE BULGE TEMPERATURE WHEN WELDING PLASTIC MATERIALS TOGETHER

[75] Inventors: Peter Haug, Singen, Germany; Jörg Wermelinger, Schaffhausen, Switzerland

[73] Assignee: Georg Fischer Rohrleitungssysteme AG, Schaffhausen, Switzerland

[21] Appl. No.: 09/112,897

[22] Filed: Jul. 9, 1998

[30] Foreign Application Priority Data

Sep. 1, 1997 [DE] Germany .................. 197 38 100

[51] Int. Cl.⁶ ............ B29C 65/02; B29C 65/10; B32B 31/20
[52] U.S. Cl. ............. 156/64; 156/304.1; 156/304.2; 156/304.6; 156/359
[58] Field of Search ................. 156/64, 304.1, 156/304.2, 304.6, 359, 73.4, 73.5

[56] References Cited

U.S. PATENT DOCUMENTS

| | | | |
|---|---|---|---|
| 3,745,641 | 7/1973 | Paolini ..................... | 156/73.4 X |
| 5,225,025 | 7/1993 | Lambing et al. .......... | 156/359 X |
| 5,241,157 | 8/1993 | Wermelinger et al. .... | 156/304.2 X |
| 5,246,534 | 9/1993 | Tanner et al. ............. | 156/304.2 X |
| 5,522,964 | 6/1996 | Granados .................. | 156/359 X |
| 5,632,845 | 5/1997 | Stehle et al. .............. | 156/304.2 |
| 5,814,181 | 9/1998 | Richter et al. ............ | 156/304.2 X |
| 5,855,720 | 1/1999 | Johnson et al. ........... | 156/304.6 X |

*Primary Examiner*—Mark A. Osele
*Assistant Examiner*—Sue A. Purvis
*Attorney, Agent, or Firm*—Bachman & LaPointe, P.C.

[57] ABSTRACT

The invention provides a method of welding together articles made of a thermoplastic plastic material by means of a butt welding process, whereby the two articles to be welded together are held in place in coaxial relationship by means of clamping devices. Then, the two articles are heated up by means of a heating device that can be placed between the two articles to create a molten up welding zone in the region of each of the free ends of the two articles. As soon as the welding zone has reached the proper temperature, the two articles to be welded together are pressed together to create a bulge. Finally, the temperature of that bulge is continuously monitored and the temperature of the material in the interior of the afore mentioned welding zone is calculated according to the formula $$T_{M(t)} = \int_0^{\tau}(T_{BT}, t)dt$$

until such a temperature is reached at which the articles can be removed from the clamping devices.

5 Claims, 2 Drawing Sheets

METHOD OF MONITORING THE BULGE TEMPERATURE WHEN WELDING PLASTIC MATERIALS TOGETHER

FIELD OF THE INVENTION

The present invention refers to a method of welding together articles made of a thermoplastic plastic material by means of a butt welding process, particularly but not exclusively to a method of welding together thermoplastic plastic pipes. Thereby, the e.g. thermoplastic pipes to be welded together are held in place in coaxial relationship, the end portions thereof are heated and the two plastic pipes are pressed together.

Such methods are also known under the headword "Heating Element Butt Welding". Thereby, the welding operation is performed in two phases in chronological sequence, i.e. a heating phase and a jointing phase.

PRIOR ART

In the publication WO 95/11124, a butt welding machine for welding together the ends of pipes is disclosed in which the parts to be welded together are held in coaxial relationship by a clamping mechanism. Amongst else, the machine comprises a sensor for measuring the ambient temperature, a timer as well as a linear measuring transducer. For monitoring the joining operation and the cooling operation, it is proposed to fix a predetermined cooling period on the basis of the measured ambient temperature. In the sense of the teaching of that invention, that predetermined time period has to pass before the parts welded together are cooled down to such a degree that the welding seam has a sufficient strength so that the parts can be removed from the clamping mechanism. The timer authoritative for the cooling period is started as soon as it has been detected, by means of the afore mentioned linear measuring transducer, that the end of the pipes have moved one against the other one by a certain amount. By means of this relative movement, it should be made sure that a mutual penetration of the ends of the pipes has taken place and that an effective welding is ensured. Even if the ambient temperature is considered for determining the strength of the articles welded together in this method, not all parameters required for a reliable welded joint are taken into account.

The publication EP-0,535,454 A2 discloses an apparatus for welding together pipes made of a thermoplastic plastic material. Thereby, the pipes are held in coaxial relationship by means of clamping mechanisms, whereby a manually actuated lever is provided for displacing at least one of the two clamping mechanisms. The apparatus comprises a process control device incorporating a data memory means for storing the relevant particulars of the pipe size and the pipe material that is relevant for a reliable welded joint. Moreover, the process control device is provided with a display and operationally connected to checking means. During the welding process, the display shows the relevant welding parameters such that, even if that apparatus is manually operated, a misoperation is more or less excluded.

Finally, the publication DE 29 23 205 C2 discloses a method and an apparatus for seamlessly joining together hollow profile members made of thermoplastic plastic material. Thereby, the hollow profile members to be fixed together are clamped such that their end faces contact each other and heated up in the contact region by means of a heating apparatus surrounding that contact region. Into the interior of the hollow profile members, a support device being variable in volume is inserted. Since the heating apparatus surrounds the end region of the two profile members, and since the support device is held under pressure during the jointing process, the pressure force required for connecting together the two hollow profile members can be supplied by the thermal expansion of the hollow profile members themselves.

Common to all methods and apparatuses for butt welding thermoplastic pipes and plastic articles, respectively, is that the joining pressure is observed during the cooling period for monitoring the joining process. This sequence is recorded in a path-pressure-power-time period-diagram. It was considered to be secured that such a process sequence be essential for the quality of the welded joint.

However, surprisingly, in the course of numerous tests, it was found that also other parameters are essential for a qualitatively high-grade and reproducible welding.

OBJECTS OF THE INVENTION

It is an object of the present invention to provide a method of welding together articles made of a thermoplastic plastic material by means of a butt welding process, particularly but not exclusively to a method of welding together thermoplastic plastic pipes, that yields in a reproducible manner an even higher quality and absolutely reliable welded joint in the shortest possible time.

SUMMARY OF THE INVENTION

To meet this and other objects, the invention provides a method of welding together articles made of a thermoplastic plastic material by means of a butt welding process. According to the method of the invention, first the two articles to be welded together are held in place in coaxial relationship by means of clamping devices. Then, the two articles to be welded together are heated up by means of a heating device that can be placed between the two articles to create a molten up welding zone in the region of each of the free ends of the two articles. As soon as the welding zone has reached the proper temperature, the two articles to be welded together are pressed together to create a bulge.

Finally, the temperature of that bulge is continuously monitored and the temperature of the material in the interior of the afore mentioned welding zone is calculated according to the formula $$T_{M(t)} = \int_0^t (T_{BT}, t) dt$$

until such a temperature is reached at which the articles can be removed from the clamping devices. In the above formula, $T_{M(t)}$ represents the temperature of the material in the interior of the welding zone versus the time, $T_{BT}$ represents the temperature at the surface of the bulge, and t represents the time.

BRIEF DESCRIPTION OF THE DRAWINGS

In the following, the method of the invention will be further described, with reference to the accompanying drawings, in which.

DETAILED DESCRIPTION OF A PREFERRED EMBODIMENT

According to the prior art, in known methods of butt welding of thermoplastic plastic pipes, only the contact pressure between the two pipes to be welded together are monitored during the cooling phase. However, the inventor has recognized that the strength of the welding zone is the real criterion for having reached the end of the cooling phase. But that strength is not directly dependent of the length of the cooling time period, rather of the internal temperature of the material to be welded together. At the end of a fixed cooling time period, and at an ambient temperature of 40° C., the temperature in the interior of the material in the welding zone is higher by more than 30° C. than at an ambient temperature of 5° C. The recognition to consider and to take into account the influence of the ambient temperature is essential for the method of the invention. Thereby, the cooling time period can be controlled in such a way that the required material strength in the welding zone is ensured.

Figure 1:
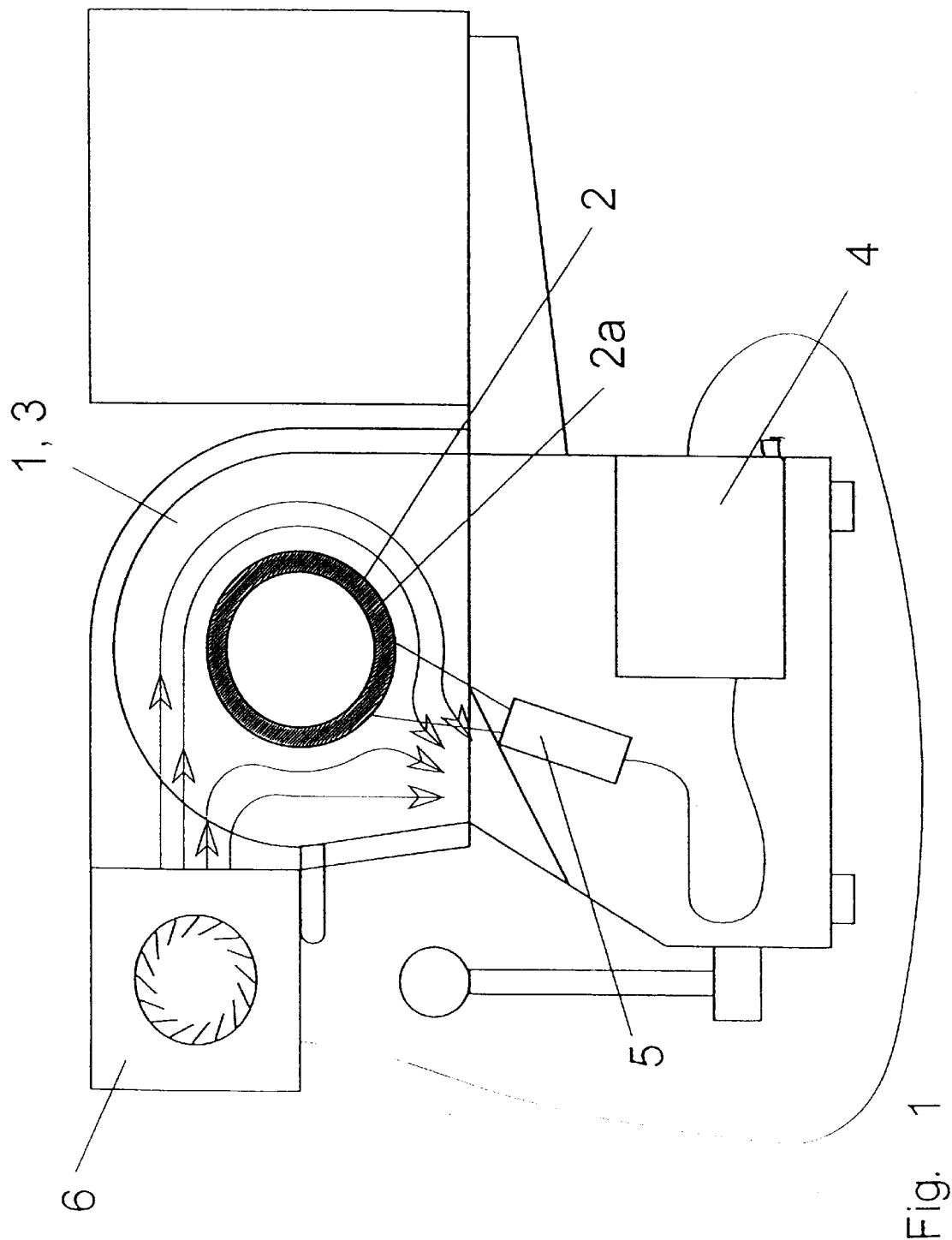
FIG. 1 shows a schematic sectional view of a butt welding apparatus adapted to be used to perform the method of the invention.

FIG. 1 is a schematic cross sectional illustration of an apparatus by means of which the method of the invention can be performed. The butt welding apparatus 1 shown in FIG. 1 is particularly suitably for butt welding together two pipes 2 made of thermoplastic plastic material. The front face of the pipe 2 is designated by reference numeral 2a. The two pipes are clamped in the butt welding apparatus, which is provided with a device for contact heating or touchless heating of the front faces 2a, by means of clamping devices 3.

An infrared sensor 5 is directed to the welding zone, i.e. to the zone where the two front faces 2a of the pipes 2 abut against each other, and detects the temperature of the material of the pipes in the welding zone. Particularly, the infrared sensor 5 detects the surface temperature of the welding bulge that is built up during the welding process. During the cooling period, subsequent to the real welding process, the output signals of the infrared sensor 5 are continuously recorded by an electronic control unit 4 and further processed, as will be explained below.

The length of the cooling down time period is determined by the maximal material temperature TM in the interior of the welding zone. This temperature is calculated by numeric integration on the basis of the signals delivered by the infrared sensor 5.

Particularly, the temperature is calculated according to the formula $$T_{M(t)} = \int_0^t (T_{BT}, t)\,dt,$$

whereby $T_{M(t)}$ represents the temperature of the material in the interior of the welding zone versus the time, $T_{BT}$ represents the temperature at the surface of the bulge, and t represents the time.

The method according to the invention determines the material temperature in the interior of the welding zone under various cooling conditions be it constant cooling, be it variably cooling. Thus, the required strength of the welded joint at the end of the cooling down period is ensured. Moreover, it is possible to shorten the cooling down time period by means of forced cooling. The efficiency of the cooling can be increased by means of a cooling air delivery assembly 6 by means of the following methods:

cooling by an air fan (high volume flow of air, low pressure); or cooling by an air compressor (low volume flow of air, high pressure.

Such a cooling assembly 6 can be integrated in the butt welding apparatus 1, or, optionally, it can be added to the butt welding apparatus 1 as an accessory.

The cooling time period is finished as soon as of the material temperature in the interior of the bulge falls short of a predetermined index value.

Figure 2:
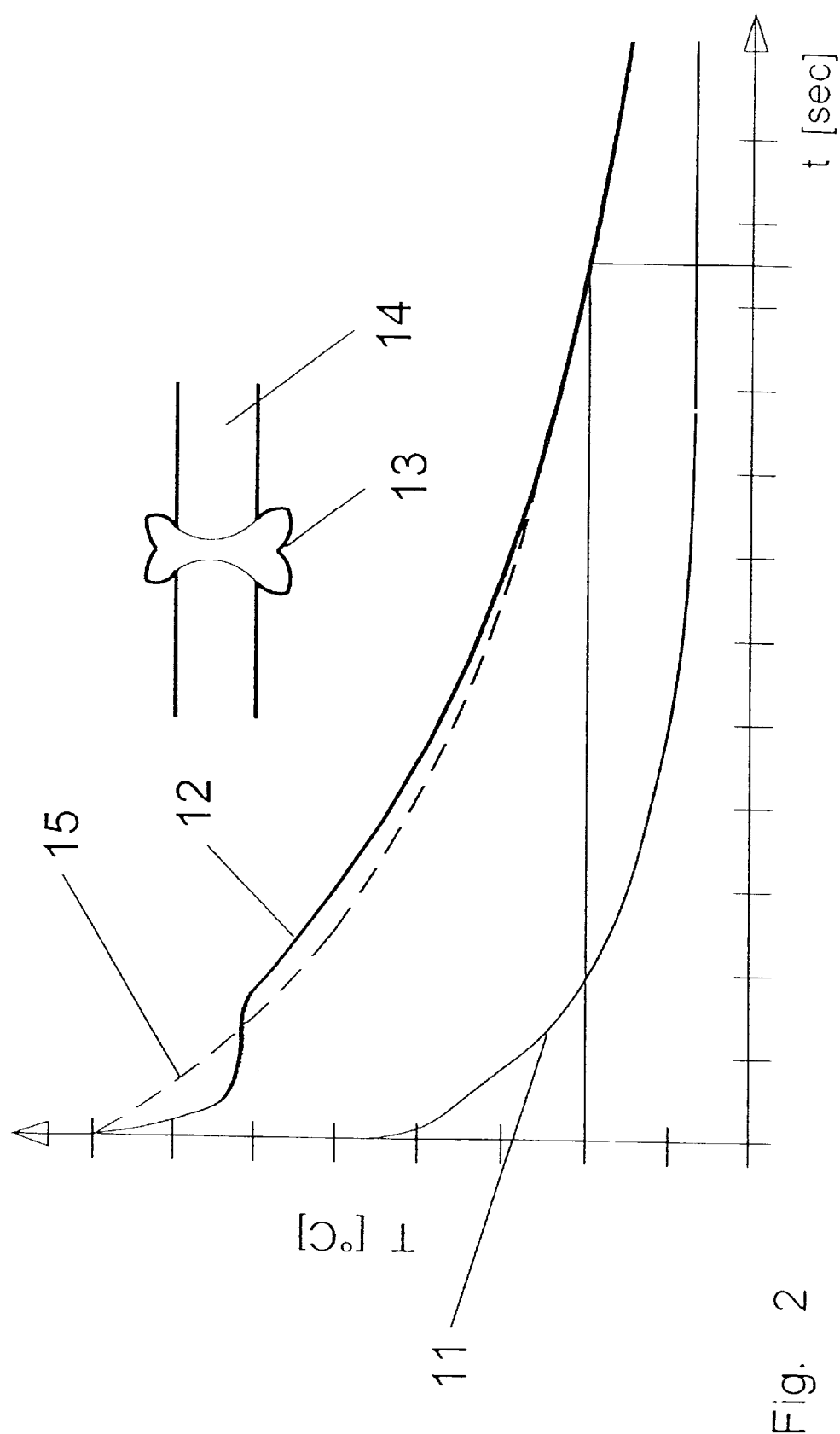
FIG. 2 shows a temperature-time-cooling diagram.

FIG. 2 shows, as an example, the cooling down traces of a welding operation. The trace 11 shows the course of the material temperature at the surface of the welding bulge 13. That welding bulge 13 is created by pressing together the softened end portions of the pipes 14 as a result of the induction of a predetermined amount of heat energy into the end portions of the pipes 14. The second trace 12 shows the effectively measured temperature of the wall of the pipe 14. The dashed line 15 shows the calculated course of the temperature of the wall of the pipe 14. It is evident that the calculated course of the temperature and the effectively measured course of the temperature at the pipe wall are practically identical.

What is claimed is:

1. A method of welding together articles made of a thermoplastic plastic material by means of a butt welding process, comprising the steps of:

holding in place in coaxial relationship the two articles to be welded together by means of clamping devices;

heating up the two articles to be welded together by means of a heating device that can be placed between the two articles to be welded together to create a molten up welding zone in the region of each of the free ends of the two articles to be welded together;

pressing together the two articles to be welded together to create a bulge;

continuously monitoring the temperature of said bulge; and calculating the temperature of the material in the interior of said welding zone according to the formula $$T_{M(t)} = \int_0^t (T_{BT}, t)\,dt,$$

whereby $T_{M(t)}$ represents the temperature of the material in the interior of said welding zone versus the time;

$T_{BT}$ represents the temperature at the surface of said bulge, and t represents the time.

2. A method according to claim 1, further comprising the step of additionally cooling said welding zone after said step of pressing together the two articles to be welded together to create a bulge.

3. A method according to claim 2 in which said further cooling is performed by means of a cooling fan.

4. A method according to claim 2 in which said further cooling is performed by means of blowing pressurized air.

5. A method according to claim 1 in which said step of heating up the two articles is performed by contact heating or by touchless heating.

* * * * *